Dec. 29, 1931.  E. J. DE NORMANVILLE  1,839,088
CONTROL MECHANISM FOR VARIABLE VELOCITY RATIO GEARING
Filed Feb. 2, 1928    3 Sheets-Sheet 1
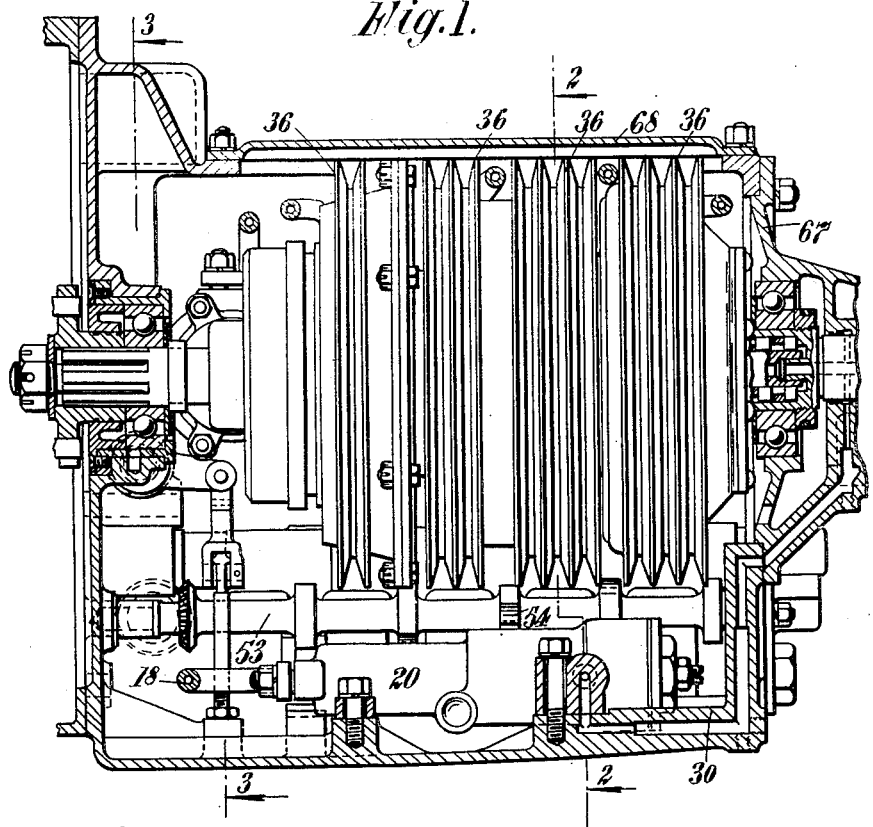
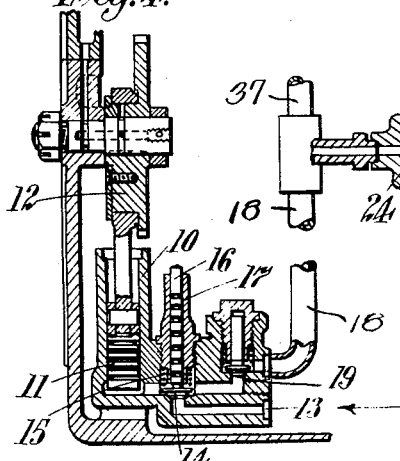
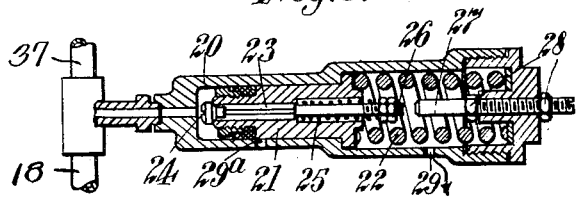
INVENTOR
Edgar Joseph de Normanville
BY
[signature]
ATTORNEY Dec. 29, 1931.  E. J. DE NORMANVILLE  1,839,088
CONTROL MECHANISM FOR VARIABLE VELOCITY RATIO GEARING
Filed Feb. 2, 1928  3 Sheets-Sheet 2

INVENTOR
Edgar Joseph de Normanville
BY
James L. Norris
ATTORNEY

Dec. 29, 1931.  E. J. DE NORMANVILLE  1,839,088
CONTROL MECHANISM FOR VARIABLE VELOCITY RATIO GEARING
Filed Feb. 2, 1928   3 Sheets-Sheet 3
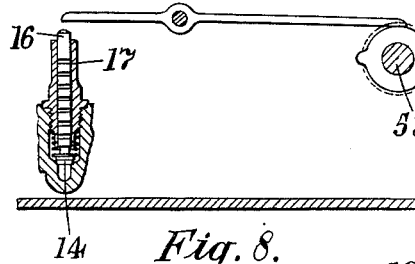
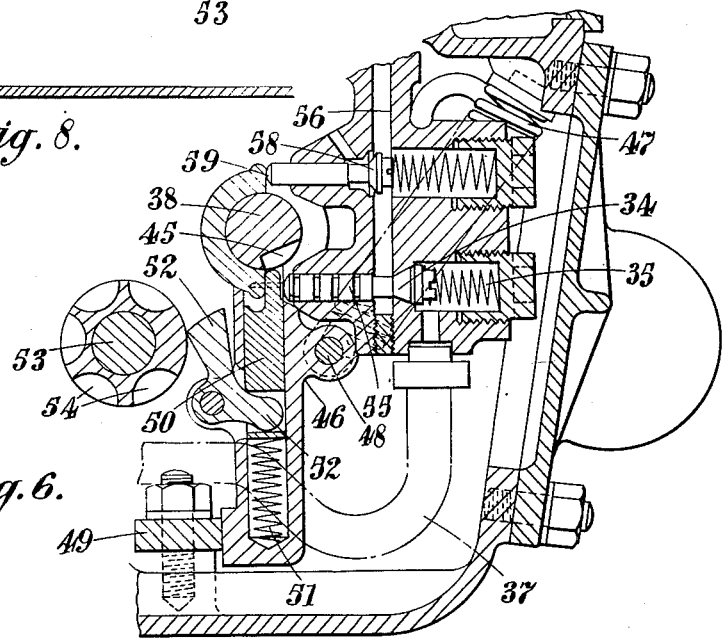
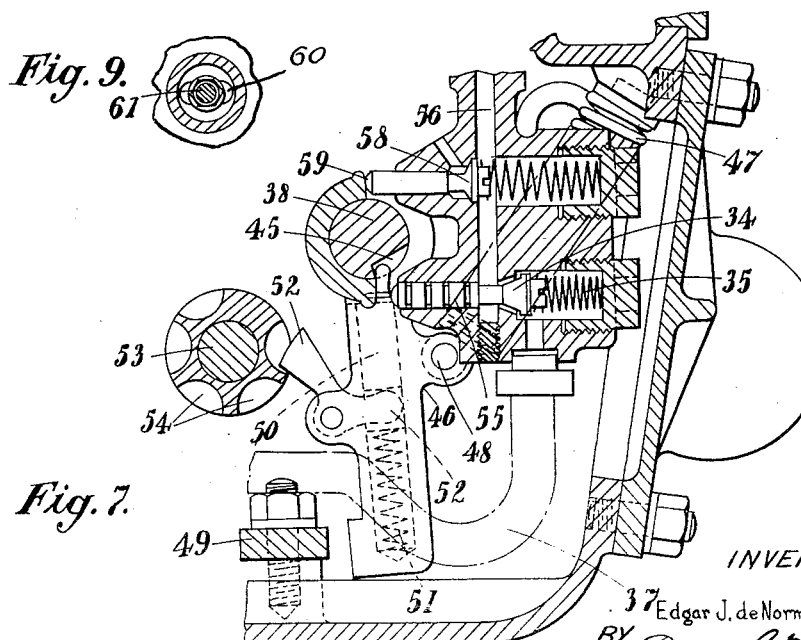
INVENTOR
Edgar J. de Normanville,
BY
ATTORNEY Patented Dec. 29, 1931

1,839,088

UNITED STATES PATENT OFFICE

EDGAR JOSEPH DE NORMANVILLE, OF LONDON, ENGLAND

CONTROL MECHANISM FOR VARIABLE VELOCITY RATIO GEARING

Application filed February 2, 1928, Serial No. 251,405, and in Great Britain February 25, 1927.

This invention relates to control mechanism for variable velocity ratio gearing, more particularly of the kind comprising groups of epicyclic gearing selectively put into operation by the application of brakes, and also applicable to other types of mechanism in which movable members, such as brake blocks, are selectively operated.

The said invention provides a control mechanism wherein the movable members or brake blocks are moved directly by fluid pressure acting upon pistons, rams or the like by which the said members are carried. Fluid under pressure is admitted to the cylinders in which the pistons or rams move, under the control of valves, which for example, may be of the slide-valve or poppet-valve type, the individual members of a group of such movable members being selectively operated under the control of a manually operated lever or pedal adapted to act on all the valves simultaneously, and having in combination therewith a control mechanism by which any of the valves or any combination thereof is alone operated in accordance with the previous setting of a selector.

In the accompanying drawings:

Figure 1 is a longitudinal sectional view of variable velocity ratio gearing provided with control mechanism in accordance with this invention.

Figure 4 is a detail view of a pump.

Figure 5 is a detail view of an accumulator comprised in the said mechanism.

Figure 6 is a view of the right-hand portion of Figure 2 on a larger scale, the valves for admitting fluid under pressure to and for permitting its discharge from one of the brake block actuating cylinders being shown, respectively, in closed and open positions.

Figure 7 is a view similar to Figure 6 but showing the valves for admitting fluid under pressure to and for permitting its discharge from one of the brake block actuating cylinders in open and closed positions, respectively.

Figure 8 is a view showing means actuated by the selector shaft for shutting off the supply of oil to the pump, and Figure 9 is a vertical section through one of the brake block actuating pistons as viewed from the rear of same.

Figure 3:
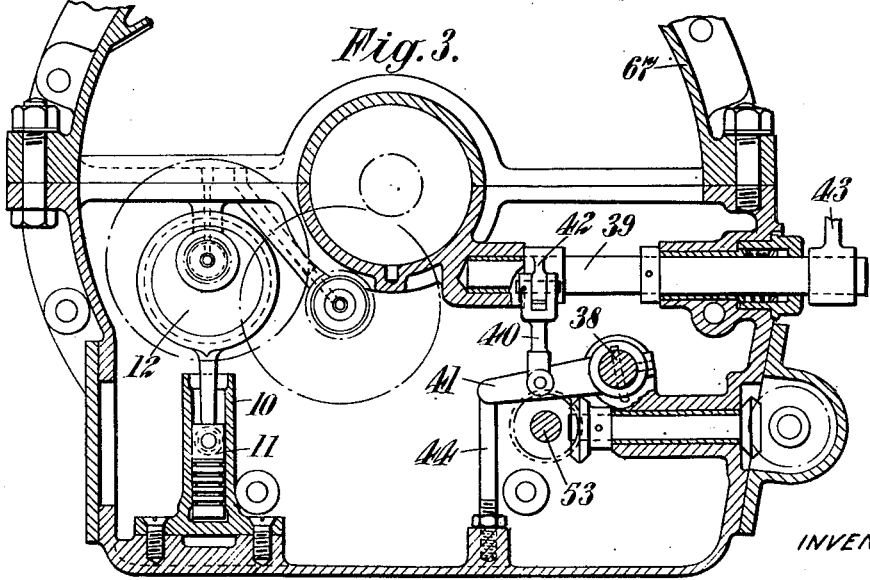
Figure 3 shows a transverse section on the line 3—3, Figure 1.

As shown in Figures 3 and 4 of these drawings, 10 is a pump cylinder in which a pump plunger 11 is reciprocated by an eccentric 12 to which a rotary movement is communicated in any convenient manner. An admission conduit 13 leading to the pump cylinder is controlled by a valve 14 closed by a spring 15. The stem 16 of this valve extends outside the valve casing 17 so that it can be acted upon to close the valve positively, at times, if desired, to cut off the supply to the pump. A conduit 18 provided with a non-return valve 19, leads from the pump to an accumulator 20, Figure 5.

The accumulator 20 is provided with a ram 21 loaded by a spring 22, and formed with a central conduit or passage 23 closed by a valve 24 held on its seat by a spring 25. The stem 26 of this valve extends out of the ram so that when the latter is moved through a sufficient distance against the resistance of the spring 22 the stem 26 encounters an abutment 27 the position of which can be adjusted by means of nuts 28. When the ram 21, owing to a rise of pressure in the accumulator 20, is moved through a sufficient distance, the valve 24 is thus caused to open, allowing fluid on the pressure face of the ram to pass through to a relief orifice 29.

Although the pump and accumulator system hereinabove described can be provided soley for supplying fluid under pressure for actuating the brake blocks, as will be described later, yet when the improved mechanism is applied, for example, to the gear box of an automobile vehicle, the said pump may also serve a forced feed lubrication system, lubricating oil being employed as the operative fluid in the hydraulic system comprised in this invention. Oil pumped through the valve 24 can then be conveyed to the forced feed lubricating system through a conduit 30 and returned to a sump from which the pump is fed through the conduit 13.

Should the rate at which oil is delivered to this accumulator 20 exceed the rate at which oil escapes or is withdrawn therefrom, the ram 21 in its movement against the action of the spring 22 opens a second relief orifice 29a allowing oil to escape freely to the sump or elsewhere as desired.

In order to prevent an excessive rise of pressure in the lubricating system a spring loaded escape valve 31 is provided in a branch from the lubricating oil conduit 30.

The oil under pressure from the accumulator 20 is admitted to the cylinders 32 (Figure 2) of brake carrying pistons or rams 33 under the control of a valve 34 urged towards its closed position by a spring 35.

A similar system of brake carrying pistons or rams 33 and an admission valve 34 is provided for each of the brake drums 36 comprised in the gear to be controlled, and these brake drums are selectively operated singly or in groups in a manner hereinafter described.

Figure 2:
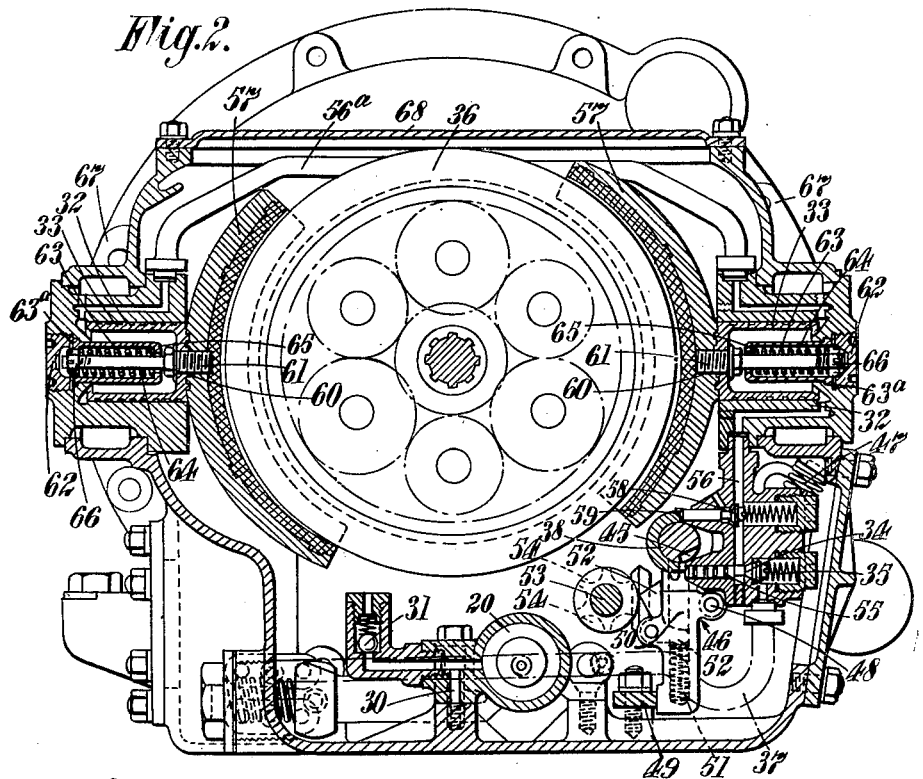
Figure 2 shows a transverse section on the line 2—2, Figure 1.

A pipe 37, Figure 2, forming an extension of the pipe 18, Figure 1, conducts oil under the pressure existing in the accumulator 20 to the valve 34 which is urged towards its closed position by the spring 35. A rock shaft 38 is connected to a pedal shaft 39 (Figure 3) by a link 40 extending between arms 41, 42 respectively fast on the rock shaft and pedal shaft. This pedal shaft may be actuated by a lever or a pedal 43 which in the case of automobile vehicles takes the place of the usual clutch pedal. When the pedal 43 is released it is rocked by its spring (not shown) so that the arm 41 is moved downwardly until its rests upon an adjustable stop or abutment 44. When the arm 41 is in this position, a series of notches 45 in the rock shaft 38, one opposite to each valve 34, are in the angular position in which the notch 45 is shown in Figures 2 and 6. In association with each notch 45 a swinging arm 46 is provided mounted loosely to rock on the shaft 38, a spring 47 in compression being attached to the said arm at 48 to urge it into contact with a stop bar 49.

Each swinging arm 46 has mounted thereon a slider 50 thrust towards the shaft 38 by a spring 51, this movement of the slider being restrained by a lever 52 resting at one end on the periphery of a selector shaft 53 having several rows of notches 54 therein. This selector shaft is mounted to rotate, and movement to rotate the shaft through any desired angle is communicated thereto by any suitable gearing actuated from a convenient remote controlling device. Thus, when any row is brought opposite to the ends of the levers 52, any of the levers having a notch opposite to it can move so as to allow the corresponding slider 50 to be moved by its spring. If there is no notch in this row opposite to a particular lever, that lever continues to hold the associated slider against movement towards the shaft 38.

By acting on the pedal 43, the shaft 38 can be rocked in a clockwise direction (Figures 2 and 3), so as to bring the notches 45 above the sliders 50. Then, any slider which, by reason of the previous setting of the selector shaft 53, is free to be moved, is thrust into a notch 45, and when the pedal 43 is released the swinging arm 46 moves with it thrusting the projected slider against the spindle 55 of the corresponding admission valve. This valve is then opened admitting fluid under pressure through a conduit 56 into the cylinder 32 to move the piston or ram 33 whereby a brake block 57 carried on this piston or ram is forcibly thrust into contact with the brake drum 36.

At any time by moving the pedal 43, the shaft 38 can be rocked so as to allow every swinging arm 46 to be returned by its spring 47 into contact with the bar 49, the effect of this movement being to allow the corresponding valve 34 to close, thus cutting off the supply of the actuating fluid to the piston or ram 33. When all the swinging arms are in contact with the bar 49, so long as the selector shaft 53 is supporting each of the levers 52, oscillation of the shaft 38 is without effect on the valves. Means can be provided in association with the selector shaft whereby when the gearing controlled by the drums 36 is set to transmit a direct driving effort a member moved by the setting of the gear acts on the spindle 16 of the valve 14 to close the same and cut off the supply of oil to the pump since at this time the gearing is rotating en bloc and the requirements for lubrication are then substantially diminished. Such a means is shown in Figure 8 where the selector shaft 53 is shown as having a cam projection which, when said shaft is rocked, engages one end of a lever to rock the same and cause the other end of the lever to engage and depress the stem 16 of the valve 14 and move said valve to its seat. When the valve 14 is closed the pump 10 operates idly until the valve is again allowed to open.

In each of the conduits 56 a relief valve 58 is provided. This valve is opened by a projection 59 on the shaft 38 engaging the stem of this valve after the closing of the valve 34, the said valve 58 closing before the admission valve 34 opens.

The operation of the gearing is as follows: When the pedal 43 is depressed the shaft 38 turns to the right (Figure 2) so as to open the valves 58 by the action of the projections 59 on the valve stems, thereby allowing the brake blocks 57 to release the brake drums 36. The brake blocks are selectively operated by turning the selector shaft 53 to a suitable position bringing the required notches 54 opposite to the levers 52, there being in each axial line through a notch other notches if required according to the number of brake drums to be operated by a particular setting of the shaft 38. The movement of any lever 52 into a notch 54 thus brought opposite to it allows a corresponding slider 50 to rise and become interposed between the stem of an admission valve 34 and the wall of a notch 45 so that by releasing the pedal 43 the shaft 38 will be rotated counter-clockwise and the corresponding admission valve 34 opened to apply the corresponding brake block and arrest movement of the corresponding drum.

The cylinders, rams and brake blocks, in the arrangement shown are arranged in pairs to cooperate on opposite sides of the brake drums, the cylinders of a pair being connected by a conduit 56a so that a substantially equal braking pressure is exerted on opposite sides of the drum.

Each piston or ram 33 has a slotted or elongated bolt hole 60 formed therein to receive a bolt or screw 61 by which the brake block 57 is attached to the said piston. Each cylinder is closed by a cover 62 which is removable in order that access may be had to the head of the screw 61 in order that the same can be loosened to allow the brake block 57 to be adjusted in an axial direction relatively to the corresponding brake drum 36. Whilst the screw 61 is loosened, by pressing the piston 33 forward the lining of the brake block 57 is pressed against the surface of the brake drum 36 so that it takes up a position ensuring an equal bearing of the brake lining upon the corresponding surfaces of the drum. After the brake block has been brought to the required position the screw 61 can be tightened.

A spring casing 63 is provided to enclose a spring 64 tending to hold the brake block away from the brake drum, this spring exerting a thrust between a shoulder 65 at one end of the casing and a nut 66 adjustable on an extension of the bolt or screw 61. The casing 63 is held with a flange 63a at one end thereof seated in a recess in the cylinder casting and held therein by the cover 62. The gear and control mechanism are enclosed in a casing 67 provided with a removable cover plate 68. By this construction access is readily had to the brake blocks 57 for renewal or repair. Each brake block can be removed and replaced through the aperture left by the removal of the cover plate, the brake blocks being adjusted to the brake drums in the simple manner above indicated.

I claim:—

1. Control mechanism for variable velocity ratio gearing comprising selectively controlled brake drums, a cylinder, a piston movable therein, a brake block and means for adjustably securing the brake block to an end wall of the piston in direct contact therewith and fastening means accessible from within the piston for securing the brake block thereto.

2. Control mechanism for variable velocity ratio gearing comprising selectively controlled brake drums, a cylinder, a piston movable therein, a brake block and means accessible from within the piston for adjustably securing the brake block to an end wall of the piston to permit adjustment of the brake block in a direction axial to the braking surface of the said block.

3. Control mechanism for variable velocity ratio gearing comprising selectively controlled brake drums, a cylinder, a hollow piston movable therein, a removable cover closing the said cylinder, a brake block and a bolt passing through a hole in an end wall of the piston and accessible from outside the cylinder by removal of the cover, said bolt serving to secure the brake block adjustably to the piston.

4. Control mechanism for variable velocity ratio gearing comprising selectively controlled brake drums, a cylinder, a hollow piston movable therein, a brake block adjustably secured to an end wall of the piston, means adjustable from within the piston for adjustably securing the brake block to an end wall of the piston to permit adjustment of the brake block in a direction axial to the braking surface of the said block, a brake drum, means for controlling the admission of fluid under pressure to the said cylinder to press the block against the drum and a spring for retracting the block from the drum.

5. Control mechanism for variable velocity ratio gearing comprising selectively controlled brake drums, cylinders in open connection, pistons movable in said cylinders respectively, brake blocks mounted on the end walls of said pistons and arranged on diametrically opposite sides of the brake drum and means for adjusting the position of each brake block relatively to its piston in a direction axial to the braking surface of the said block.

6. Control mechanism for variable velocity ratio gearing comprising selectively controlled brake drums, cylinders, pistons movable in the cylinders and carrying brake blocks, valves for admitting fluid under pressure to the said cylinders, valves for releasing the pressure in the said cylinders, a rock shaft, a projection on the said shaft for opening all the pressure releasing valves simultaneously, and means for selectively opening the pressure admission valves when the rock shaft is moved to allow the pressure releasing valves to close.

7. Control mechanism for variable velocity ratio gearing comprising selectively controlled brake drums, cylinders, pistons movable in the cylinders and carrying brake blocks, valves for admitting fluid under pressure to the said cylinders, a rock shaft having notches therein, swinging arms respectively corresponding to each notch, sliders carried by the said swinging arms, and means for selectively projecting the sliders into the notches so that the arms may be swung by the rock shaft to open the said valves.

8. Control mechanism for variable velocity ratio gearing comprising selectively controlled brake drums, cylinders, pistons movable in the cylinders and carrying brake blocks, valves for admitting fluid under pressure to the said cylinders, a rock shaft having notches therein, swinging arms respectively corresponding to each notch, sliders carried by the said swinging arms, springs for projecting the sliders towards the rock shaft to engage in the notches therein, levers for holding the sliders against the action of the springs, a selector shaft supporting the levers against the action of the springs, and notches in the said selector shaft for selectively allowing the levers to release the said sliders.

9. Control mechanism for variable velocity ratio gearing comprising selectively controlled brake drums, cylinders, pistons working in said cylinders, brake blocks carried by said pistons, valves for admitting fluid under pressure to the cylinders, a rock shaft, swinging arms movable by the rock shaft to operate the valves, and means for selectively coupling the said arms to the rock shaft.

10. Control mechanism for variable velocity ratio gearing comprising cylinders, pistons movable in said cylinders by fluid pressure, valves for controlling the admission of fluid pressure to said cylinders, relief valves for controlling the escape of fluid pressure from said cylinders, a rock shaft, means operative when the said shaft is rocked in one direction for opening the relief valves, means operative when the said shaft is rocked in the opposite direction for opening the admission valves, and means for selectively rendering inoperative the means for opening the admission valves.

11. Control mechanism for variable velocity ratio gearing comprising cylinders, pistons movable in said cylinders by fluid pressure under the control of valves, a rock shaft having notches along its length, independently movable spring pressed swinging arms mounted on the said shaft, sliders mounted in the said arms, springs urging the said sliders towards the said shaft to engage the notches therein, levers pivotally mounted on the said arms, a selector shaft for holding the said levers in positions to maintain the sliders retracted against their springs and until notches in the said selector shaft are brought opposite to the said levers by movement of the selector shaft to permit selected levers to move to release the said sliders to the action of their respective springs.

EDGAR JOSEPH de NORMANVILLE.